United States Patent Office 3,432,681

Patented Mar. 11, 1969

3,432,681

OSCILLATION CIRCUITS CONTROLLED WITH FERROMAGNETIC THIN FILMS

Shintaro Oshima, Musashino-shi, and Tetsusaburo Kamibayashi, Kitaadachi-gun, Saitama-ken, Japan, assignors to Kokusai Denshin Denwa Kabushiki Kaisha, Tokyo-to, Japan, a joint-stock company of Japan Filed Mar. 9, 1964, Ser. No. 350,431

Claims priority, application Japan, Mar. 11, 1963, 38/10,978; Dec. 9, 1963, 38/65,923; Jan. 14, 1964, 39/1,340

U.S. Cl. 307—88 6 Claims

Int. Cl. H03b *15/00*

ABSTRACT OF THE DISCLOSURE

An oscillator the start or termination of the oscillation of which is controlled in accordance with a decrease of hysteresis loss of at least one ferromagnetic thin film core associated, through a conductor carried by the core, with the oscillator when at least one magnetic field is applied to the core in the direction orthogonal to the easy magnetization direction of the core. A shift register or logical circuits can be formed by a plurality of the oscillators.

This invention relates to an oscillation circuit controlled with a ferromagnetic thin film or films and to a combination of a plurality of said oscillation circuits adapted to be used as logical circuits or control circuits.

It is recognized in the art that a parametron, one of the control elements of the type above referred to, having a magnetic core or cores in the form of a ferromagnetic thin film is more advantageous than a conventional parametron having a ferrite core or cores in that it has a higher computing speed, higher Curie temperature of the core, and smaller size and is easier to fabricate. However, fundamentally, as the parametron effects the required logical operation by utilizing, as a parameter, phase of an oscillation energy which is O phase or $\pi$ phase, there are the following difficulties in the case where a high-speed logical operation is essential. That is, it is desired to use an excitation with several tens of megacycles to several hundreds of megacycles in order to provide high-speed logical operations. To attain this purpose, however, it is difficult to produce a polyphase excitation current having such high frequencies, and, moreover, it is necessary to maintain desired phase differences between the excitation currents of the respective phases. Further, in the transmission of information signals, as the logical operation is based on the phase position of the information signals, it is necessary to transmit the information signals through a plurality of parametron elements, while maintaining accurate phase relations between the information signals. However, at the high excitation frequencies as above mentioned, the distributed electrical constants, such as stray capacitance or stray inductance of conductors, result in undesirable phase shift, thus making it very difficult to fulfil the above mentioned requirements in practical devices.

An object of the present invention is to provide an oscillation circuit which can handle binary informations based on the "amplitude," said information not always having "a phase parameter."

Another object of the invention is to provide an oscillation circuit capable of being regulated with ferromagnetic film component.

A further object of the invention is to provide a combination of a plurality of said oscillation circuits to be used as a logical circuit.

Said objects and other objects of the invention can be attained by an oscillation circuit, according to this invention, which comprises a ferromagnetic thin film core carrying a primary conductor and a secondary conductor, and an oscillator associated with said secondary conductor. A plurality of the cores and the primary conductors can be provided, if necessary. In said oscillation circuit, said primary conductor is arranged so that the current flowing through the primary conductor magnetizes the thin film core in the direction orthogonal to the easy axis of the thin film and said secondary conductor is arranged so that the magnetic flux caused by the current in the secondary conductor is parallel to the easy axis of the thin film, and, further, an input signal is applied to said primary conductor, whereby the oscillation of said oscillator is made to start or terminate in accordance with the deviation of Q of the resonance circuit of the oscillator caused by the application of said input information signal.

The novel features of the present invention are set forth with particularity in the appended claims. This invention, however, both as to its construction and operation together with further objects and advantages thereof, may best be understood by reference to the following description, taken in connection with the accompanying drawings, in which the like parts are designated by the like reference characters, and in which:

Figures 1, 2A, 2B, 3A, 3B:
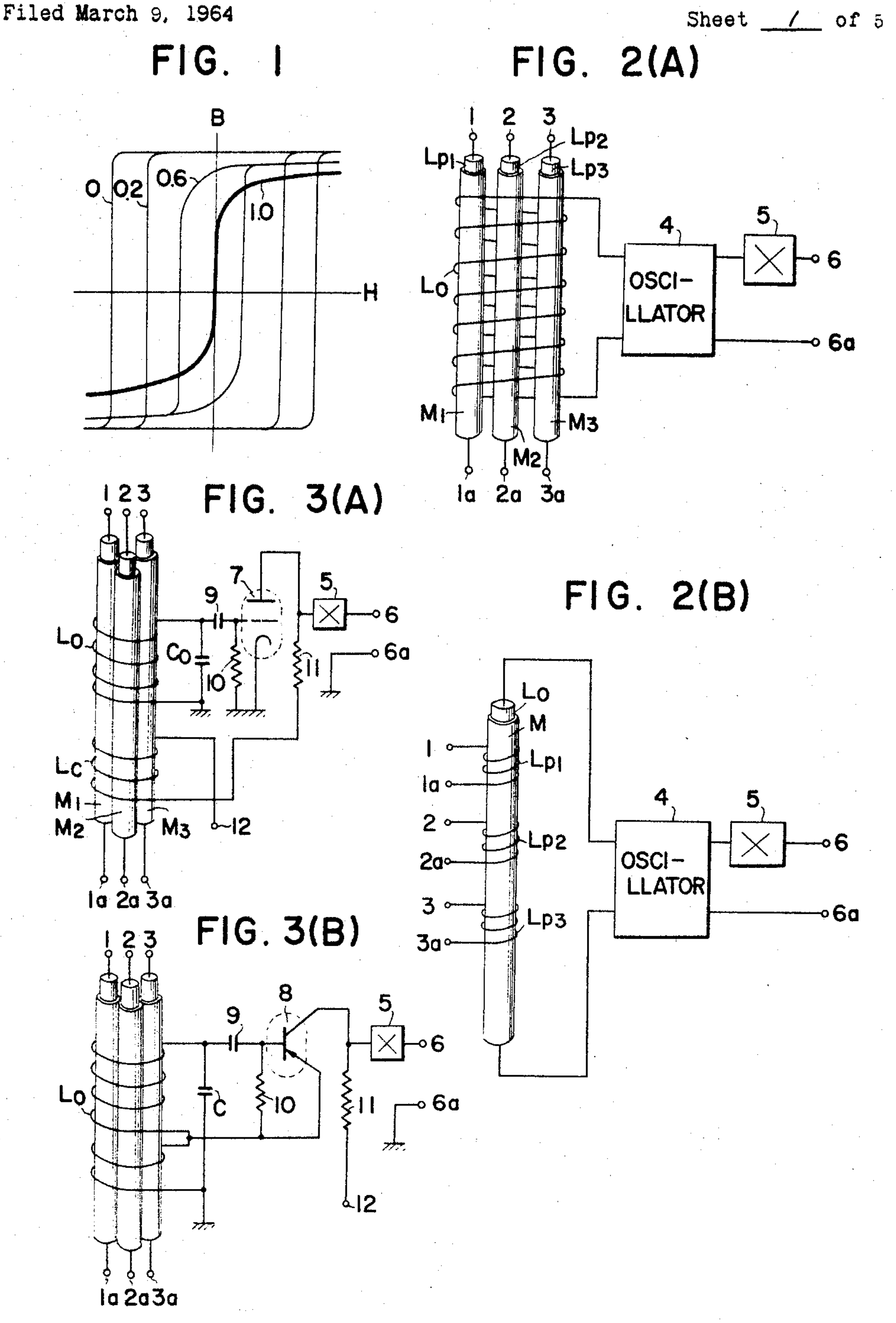
FIGS. 1, 4, 5 and 10 illustrate various characteristic curves useful for explaining the operation of the oscillation circuit embodying the invention.
FIGS. 2A, 2B, 3A, 3B, 3C, 3D and 3E are diagrammatic views of various examples of oscillation circuits of this invention.

First, the principle of the invention will be explained by referring to FIG. 1 of the accompanying drawing. Generally, when a ferromagnetic thin film is subjected to a transverse magnetic field which is in the direction perpendicular to its easy axis, the magnetic hysteresis characteristic thereof as viewed in the direction along the easy axis varies along curves as shown in FIG. 1. Thus, the hysteresis characteristic varies in such a manner that the coercive force *Hc* of the film decreases in accordance with the increase of the intensity of the transverse magnetic field. Accordingly, when a winding is wound on the ferromagnetic thin film or when this ferromagnetic thin film is deposited on a conductor so that the magnetic flux produced by the current flowing through said winding or conductor is parallel to the easy axis of the thin film, the effective resistance of the winding or the conductor due to hysteresis loss (or the alternating-current effective resistance) as well as the Q of the winding can be made to vary in relation to the increase or decrease of the intensity of said transverse magnetic field.

More particularly, the Q of a coil wound on a magnetic core is generally expressed by the following equation:

$$Q \doteqdot \frac{\omega L}{R_1+R_2+R_3} \quad (1)$$

where $R_1$ represents the direct-current resistance of the coil, $R_2$ the high frequency resistance due to the skin effect, $R_3$ the effective resistance due to the hysteresis loss, L the inductance of the coil and $\omega$ the angular frequency of the exciting current. Of course, the hysteresis loss is proportional to the area bounded by the hysteresis loop so that the value of the effective resistance $R_3$ in the Equation 1 decreases extremely due to the change in the hysteresis characteristic caused by the increase in the intensity of the transverse magnetic field. With regard to other components of the Equation 1, while the resistances $R_1$ and $R_2$ do not change by any appreciable amount with the increase in the intensity of the transverse magnetic field, the inductance L decreases due to a slight decrease in the differential permeability $\mu r$ with respect to the oscillation current. However, as this decrease in the inductance L is far smaller than the decrease in the effective resistance $R_3$ due to the decrease in the hysteresis loss, the value of Q represented by the Equation 1 is increased remarkably with the increase in the transverse magnetic field.

It is the principle of this invention that above-mentioned increase in the value of Q of the coil due to the increase in the transverse magnetic field is utilized to control initiation and termination of oscillation in an oscillator including a resonance circuit utilizing the coil as one of its component elements.

Referring now to FIG. 2A, there is shown one typical embodiment of the oscillation circuit embodying the principle of this invention. In the form shown in FIG. 2A, each of the magnetic cores comprises conductors $L_{p1}$, $L_{p2}$ and $L_{p3}$ (primary conductors) and ferromagnetic thin films $M_1$, $M_2$, and $M_3$ which are, respectively, deposited on the surfaces of the conductors by vapor deposition or electrolytic plating. The easy axes of the thin films $M_1$, $M_2$ and $M_3$ are oriented in the longitudinal direction of the respective conductors $L_{p1}$, $L_{p2}$ and $L_{p3}$, so that the magnetic flux produced by a current flowing through a coil $L_o$ (a secondary conductor) wound on said cores will be parallel to the easy axes of the ferromagnetic thin films $M_1$, $M_2$ and $M_3$. An oscillator 4 is constructed by utilizing the coil $L_o$ as one of its component elements and input signals $I_1$, $I_2$ and $I_3$ (DC or AC) are respectively impressed across terminals 1, 1*a*; 2, 2*a* and 3, 3*a* of the conductors $L_{p1}$, $L_{p2}$ and $L_{p3}$. Since the magnetic fluxes produced by these input signals $I_1$, $I_2$ and $I_3$ are perpendicular to the easy axes of the ferromagnetic thin films $M_1$, $M_2$ and $M_3$, it can be clearly noted from the principle of this invention described above that impression of the input signals $I_1$, $I_2$ and $I_3$ contribute to vary the Q of the coil $L_o$. By utilizing this variation in the Q, it is possible to initiate or stop the oscillation of the oscillator. Although, in the form shown in FIG. 2A, three magnetic cores are provided to receive three independent input signals, it should be understood that a plurality of input signals may be impressed upon a single core. In the case where a plurality of signals are applied in the manner as above described, control of the oscillator is effected dependent upon the decision by majority, as fully described later. In such a case, where AC input signals are employed, the binary numbers "1" and "0" are made to correspond to "0 phase" and "$\pi$ phase," respectively, of the phase positions. However, when DC input signals are used, they are made to correspond to "positive (+) polarity" and "minus (−) polarity," respectively. When decision by majority is not required, only a single input signal may be used. The output of the oscillator 4 is derived from output terminals 6 and 6*a* via a coupling means 5 which may comprise a capacitor, a rectifier, a coupling transformer and the like.

FIG. 2B illustrates another example of this invention utilizing a ferromagnetic thin film M with its easy axis in the circumferential direction. While the primary conductors for applying the input signals $I_1$, $I_2$ and $I_3$ are wound on the film M, the magnetic fluxes produced by them flow in a direction perpendicular to said easy axis of the film in the same manner as in the previous embodiment. A conductor $L_o$ having the film deposited thereon is utilized as a secondary conductor whose Q is to be regulated. Another operation of the embodiment shown in FIG. 2B is identical to that described in connection with FIG. 2A.

Figures 3C, 3D, 3E, 4, 5:
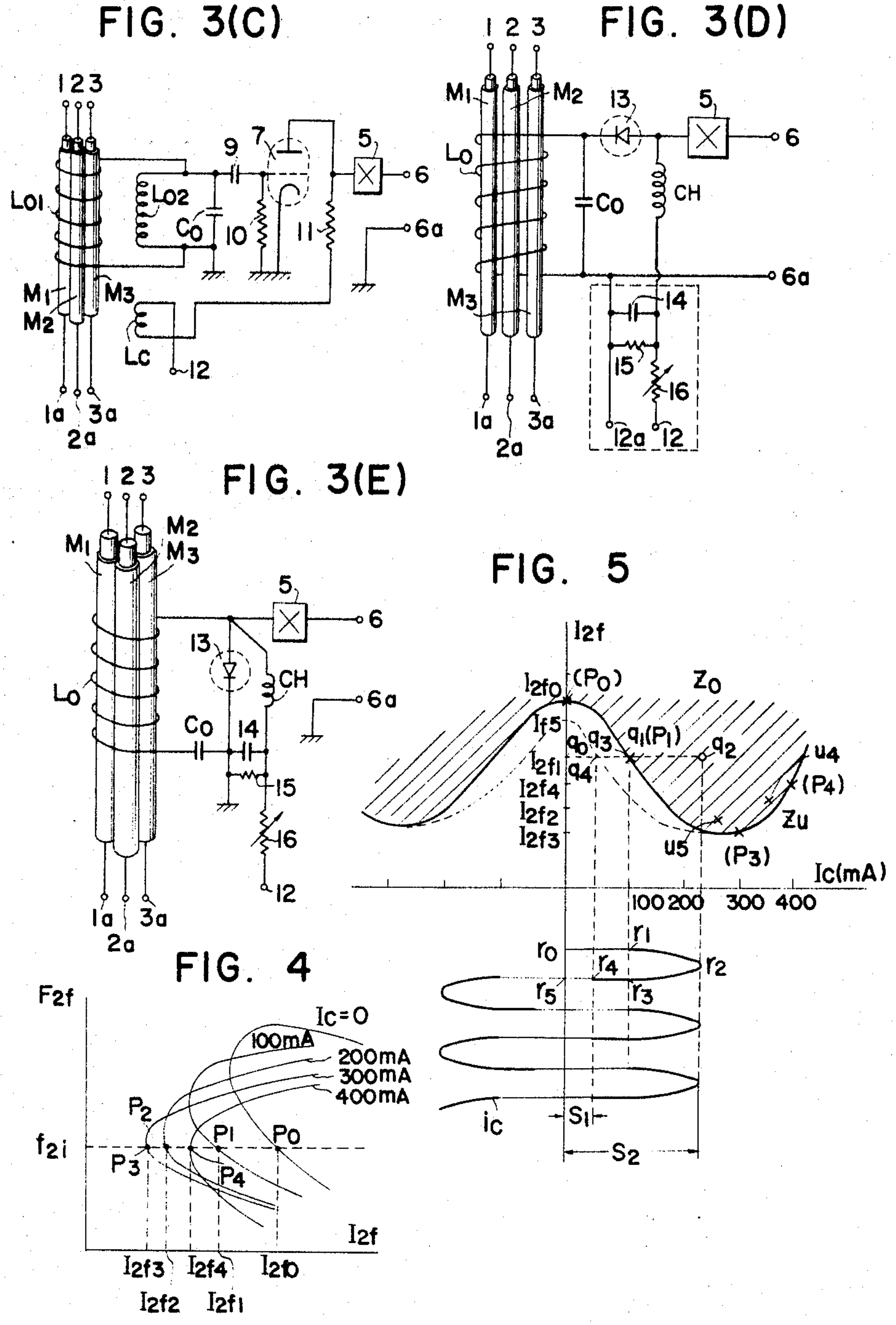

FIGS. 3A, 3B and 3C illustrate some practical constructions of the oscillation circuit. FIG. 3A shows a grid tuning type oscillation circuit, FIG. 3B a Hartley oscillation circuit utilizing a transistor and FIG. 3C a Hartley oscillation circuit utilizing a vacuum tube. In FIGS. 3A and 3B a coil $L_o$ with regulatable Q is utilized as a tuning inductance of the oscillator circuit, whereas in the embodiment shown in FIG. 3C a separate tuning inductance $L_{o2}$ is provided for the tuning circuit, and said coil $L_{o1}$ is connected across the tuning inductance $L_{o2}$. In these figures, reference characters 7, 8, 9, 10, 11, $L_c$ and $C_o$ indicate a vacuum tube, a transistor, a coupling capacitor, a bias resistor, a load resistance, a coupling coil and a tuning capacitor, respectively. A terminal of a DC supply source is shown at 12. As the coupling means 5, a capacitor is used to derive alternating-current signals, and a rectifier is used to derive direct-current signals, but a resistor may be incorporated, if desired.

With these embodiments shown in FIGS. 3A and 3B, as the Q of the coil $L_o$ included in the oscillation circuit is low in the absence of an input signal, the oscillation circuit does not start to oscillate, but upon impression of input signals ($I_1$, $I_2$ and $I_3$), the Q of the coil $I_0$ increases to satisfy the oscillation condition. In the circuit shown in FIG. 3C, since the coil $L_{o1}$ is connected in parallel with the tuning circuit of the oscillator, in the absence of any input signal, the Q of the coil $L_{o1}$ is low (which means that the effective resistance is large), and, hence, the Q of the tuning circuit of the oscillator is high, thus maintaining the oscillator in operation. However, when input signals are impressed on the input terminals, the Q of the tuning circuit is decreased owing to the decrease in the effective resistance of the coil $L_{o1}$, whereby the operation of the oscillator is stopped.

FIGS. 3D and 3E illustrate examples of this invention wherein a tunnel diode is used in the oscillator which is constructed in accordance with the principle of this invention. Each of these embodiments comprises a tunnel diode 13, a smoothing capacitor 14 and a choke coil CH. A fraction of a DC voltage impressed across DC terminals 12 and 12*a* and divided by a potentiometer including a variable resistor 16 and a fixed resistor 15 is impressed across the tunnel diode 13, the magnitude of this DC fractional voltage being selected to be in a range in which the diode exhibits negative characteristic. As is well known in the art, while these oscillators oscillate owing to the negative resistance characteristic of the tunnel diode, their oscillation frequencies are substantially equal to the resonance frequency of a tuning circuit composed of a coil $L_o$ and a tuning capacitor $C_o$ which are identical to those illustrated in the previous embodiments. With regard to the relation between the impression of the input signals ($I_1$, $I_2$ and $I_3$) and initiation or termination of the oscillation, decrease in the Q of said tuning circuit results in a decrease in the amplification factor of said tunnel diode 13, so that the oscillator maintains its operation in the absence of the input signals ($I_1$, $I_2$ and $I_3$), but ceases to oscillate upon impression of the input signals.

In each of the embodiments shown in FIGS. 3A, 3B, 3C, 3D and 3E, the described means for deriving the oscillator output may be replaced by a suitable resistor or other means adapted to derive the variation in DC voltage in response to starting and stopping of the oscillation.

An application of the principle of this invention to the control of an oscillation circuit which is parametrically excited will now be described hereinbelow. It is well known in the art that when a tuning or resonance circuit including a non-linear element is parametrically excited at a frequency $2f$ which is twice the tuning frequency $f$, the tuning circuit produces a parametrically oscillatory wave having the frequency $f$. In the case of a tuning circuit including an inductance element having a ferromagnetic thin film core, it is possible to control initiation and termination of the oscillatory wave due to the parametrical excitation, by applying a transverse magnetic field to the thin film. The operation will be disclosed in detail by referring to the accompanying drawing.

FIG. 4 shows a number of curves of oscillation regions at the indicated values (0, 100, 200 milliampere (ma.)) of the transverse magnetic field current $I_c$ when a tuning circuit comprising an inductance element having a ferromagnetic thin film core (for example, a tuning circuit shown in FIG. 6 to be described later) is used, wherein the ordinate represents the oscillation frequency $F_{2f}$ and the abscissa represents the excitation current $I_{2f}$, and the measurements were made at a constant bias current $I_{DC}$. Regions bounded by parabolic characteristic curves indicate the oscillation regions. More particularly, at an excitation frequency $f_{21}$, since a dotted line indicating this value crosses the respective characteristic curves at points $P_0$, $P_1$, $P_2$, $P_3$ and $P_4$ respectively, an oscillation wave of a frequency $f_1$ caused by the parametrical excitation is produced in the tuning circuit by each of exciting currents $I_{2f0}$, $I_{2f1}$, $I_{2f2}$, $I_{2f3}$ and $I_{2f4}$ corresponding, respectively, to the values 0, 100 ma., 200 ma., 300 ma. and 400 ma. of the current $I_c$ for the transverse magnetic field. From these characteristic curves it will be noted that when the oscillator is excited by an exciting current $I_{2f2}$ having an excitation frequency $f_{21}$, for example, the operation points are not included in the oscillation region when the current for producing the transverse magnetic field is small (about 0 to 100 ma.), so that the oscillation circuit does not begin to oscillate. However, when the current is increased over 200 ma., the oscillation circuit begins to oscillate.

Curves of FIG. 4 are shown in different forms in FIG. 5 in order to indicate more comprehensibly. In FIG. 5, the abscissa indicates the current $I_c$ for producing the transverse magnetic field, and the ordinate the excitation current $I_{2f}$. A heavy line showing the boundary of the oscillation region $Zo$ (shaded portion) is plotted by connecting various points (indicated by marks $x$ in FIG. 5) corresponding to the points $P_0$, $P_1$, $P_2$, $P_3$ and $P_4$ in FIG. 4. If it is assumed that the magnetic core of ferromagnetic thin film is excited by a current $ic$ for producing the transverse magnetic field in addition to the excitation provided by an excitation current $I_{2f1}$ (having a constant frequency), at a point $r_0$, the oscillator does not oscillate because at this point the current $I_c$ is equal to zero, corresponding to a point $q_0$ on the characteristic curve, as shown in FIG. 5. Since the amplitude of the current $ic$ for producing the transverse magnetic field is increased to a point $r_1$, the operating point is moved to a point $q_1$ on the characteristic curve to initiate oscillation. Thereafter, since the amplitude of the current $ic$ varies successively through points $r_1$, $r_2$ and $r_3$, the operating point is shifted to points $q_1$, $q_2$ and $q_3$. However, owing to the effect of the hysteresis characteristic of the ferromagnetic thin film, the oscillation is not terminated at the point $q_3$, but is terminated when the operation point further reaches a point $q_4$. Portions of the current wave indicated by heavy lines (for instance, a section $r_1$–$r_2$–$r_3$–$r_4$) indicate the sections of the wave form of the current $ic$ in which oscillation waves are produced by parametrical excitation.

As can be clearly understood from FIG. 4, in order to control the initiation and termination of the oscillation wave caused by the parametrical excitation by impressing the transverse magnetic field to the oscillation circuit, the excitation current $I_{2f}$ should have a value within a fixed range determined by the tuning circuit and the mode of excitation. In the case shown in FIG. 4, of course, the oscillation will not be stopped by an excitation current larger than that corresponding to a point $P_0$. However, once the oscillation is initiated, it is impossible to stop it even with a current larger than the current $I_{2f5}$ corresponding to a point at which the oscillation stop line indicated by a dotted line and the ordinate at which $I_c=0$ cross each other. On the other hand, if the current is less than $I_{2f3}$, it is impossible to initiate oscillation by varying the intensity of the transverse magnetic field. Accordingly, in a circuit having the characteristics as shown in FIG. 4, it can be concluded that the value $ie$ of the excitation current should satisfy the relation ($I_{2f5}>ie>I_{2f3}$) in order to initiate or terminate oscillations in the tuning circuit generated by the parametrical excitation by varying the intensity of the transverse magnetic field or by the application or removal thereof.

Figures 6A, 6B, 6C, 6D, 6E, 7:
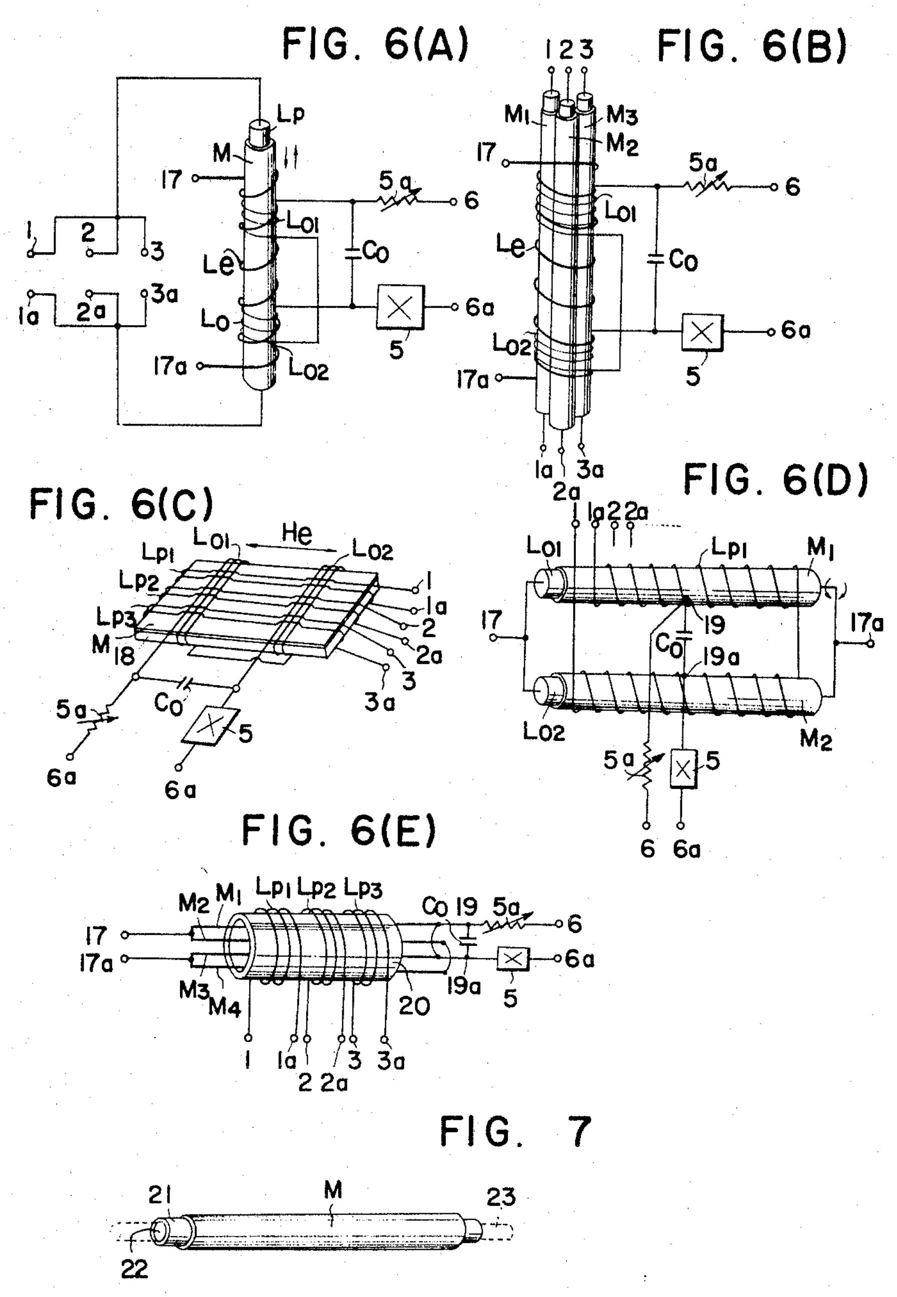
FIGS. 6A, 6B, 6C, 6D and 6E are diagrammatic views of oscillation circuits of this invention which are parametrically excited.
FIG. 7 is a perspective view of a film-shaped core utilized in the oscillation circuit of this invention.

FIGS. 6A, 6B, 6C, 6D and 6E illustrate several embodiments of this invention embodying the principle described above in conjunction with FIGS. 4 and 5. Referring first to FIG. 6A, a pair of oscillation coils $L_{o1}$ and $L_{o2}$ are wound on a magnetic core comprising a film M of a ferromagnetic material deposited on the surface of a conductor $L_p$, and these coils are connected, in series, in opposite sense to form an oscillation winding $L_o$. A tuning capacitor $C_o$ is connected in parallel with this winding to form a tuning circuit having a resonance frequency of $f$. The easy axis of the film M is oriented in the longitudinal direction thereof. A coil $L_e$ for providing a parametrical excitation of a frequency $2f$ is wound on the film M concentrically with the coils $L_{o1}$ and $L_{o2}$ so as to uniformly excite the film M, the terminals of the excitation coil $L_e$ being represented by numerals 17 and 18. Other components shown in FIG. 6 are represented by the same reference numerals as those used for the same components in FIGS. 2A and 2B. Unless the input terminals 1, 1*a*; 2, 2*a* and 3, 3*a* are supplied with input signals $I_1$, $I_2$ and $I_3$, supply of the above described appropriate excitation current $ie$ to the winding $L_e$ will not result in the generation of an oscillation having a frequency $f$ in the tuning circuit. In this case, the circuit is in the non-oscillation region $Zu$ of FIG. 5. When the input signals are impressed, since the hysteresis loss in the ferromagnetic thin film M is decreased, the operating point of this circuit is shifted into the oscillation region, thereby initiating the oscillation. The output is derived in the same manner as in the previous embodiments. An adjustable resistor 5*a* is included to stabilize the operation of the circuit against adverse effect caused by coupling to the succeeding circuit. It should be understood that the starting and stopping of the oscillation caused by varying the excitation current, as has been described in connection with FIG. 5, are of the static character and that actually the oscillation is maintained by the resonance effect of the tuning circuit. Applications of this circuit to logical circuits will be described hereinbelow in more detail.

In the example shown in FIG. 6A, only a single core is employed to commonly receive the input signals. However, in the example shown in FIG. 6B, a plurality of cores are used to separately receive the respective input signals $I_1$, $I_2$ and $I_3$. Other features of construction and operation of the embodiment in FIG. 6B are identical to those of FIG. 6A. As pointed out hereinabove, since separate input signals are impressed upon separate cores, it is possible to independently control the oscillation by individual input signals $I_1$, $I_2$ and $I_3$.

FIG. 6C illustrates a further embodiment of this invention, which comprises a magnetic core of a ferromagnetic thin film M deposited on a substrate 18 by vacuum vapor deposition technique, electric plating and the like, and coils uniformly wound on the longitudinal axis of the core (for simplicity only one coil being shown). With this construction, it is possible to produce an oscillation having a frequency $f$ in an oscillation circuit formed by secondary conductors $L_{o1}$, $L_{o2}$ and a tuning capacitor $C_o$, and to balance out the excitation frequency component $I_{2f}$ across the terminals 6 and 6*a*. Initiation and termination of the oscillation are controlled by the impression of the input signals $I_1$, $I_2$ and $I_3$.

The embodiment shown in FIG. 6E comprises a plurality of input windings $L_{p1}$, $L_{p2}$ and $L_{p3}$ wound on a tube 20 of an insulating material and an oscillation circuit contained in the tube, the oscillation circuit being formed by folding a bridge type oscillation circuit which is shown in FIG. 6D.

Actually, in the embodiments shown in FIGURES 6A, 6B, 6C and 6D, insulator tubes having preformed windings thereon may be used, and conductors may be inserted through the tubes. It is to be understood that this invention is not limited to the particular constructions of the ferromagnetic thin film core illustrated in the previous embodiments, but can be practiced by using a tube 21 (which may be either a conductor or an insulator) having an axial opening 22 and a magnetic core of a ferromagnetic thin film M deposited thereon, as shown in FIG. 7.

The tube 21 can be assembled in a circuit so as to make the excitation current, oscillation current and/or current for producing the transverse magnetic field pass through the tube 21 itself when it is made of a conductor or through one or more conductors 23 inserted therein when the tube 21 is made of an insulator.

Oscillation coils $L_{10}$ and $L_{20}$ (not shown) are wound on an axis parallel to the easy axis of the core, which are connected, in series, in opposite sense and a tuning capacitor $C_o$ (not shown) is connected in parallel with the serially connected oscillation coils. It is understood that an excitation winding (also not shown for the sake of brevity) is wound coaxially with the oscillation coils $L_{o1}$ and $L_{o2}$ in order to excite the film M in the direction of the excitation magnetic field H*e*. However, the input windings $L_{P1}$, $L_{P2}$ and $L_{P3}$ (primary conductors) for providing the transverse magnetic field are wound on an axis which is perpendicular to the easy axis. The operation of this oscillator is substantially the same as those shown in FIGS. 6A and 6B. Instead of such arrangement of the input windings $L_{P1}$, $L_{P2}$ and $L_{P3}$ wound on the limited portions of the magnetic core, as shown in the drawing, they can be wound over wider areas for improving the efficiency of control.

The embodiment shown in FIG. 6D comprises two cores of ferromagnetic films respectively deposited upon the secondary conductors $L_{o1}$ and $L_{o2}$. These cores have their easy axes in the circumferential direction and are connected in parallel to each other. The excitation current $I_{2f}$ and the bias current $I_{DC}$ are supplied to the secondary conductors $L_{o1}$ and $L_{o2}$ through their terminals 17 and 17*a*. A tuning capacitor $C_o$ is connected between substantially middle points 18 and 18*a* of the films $M_1$ and $M_2$. The primary conductors $L_{P1}$ and $L_{P2}$ adapted to supply the input signals are wound on the magnetic films $M_1$ and $M_2$, respectively.

Figures 8, 9A, 9B, 9C, 10:
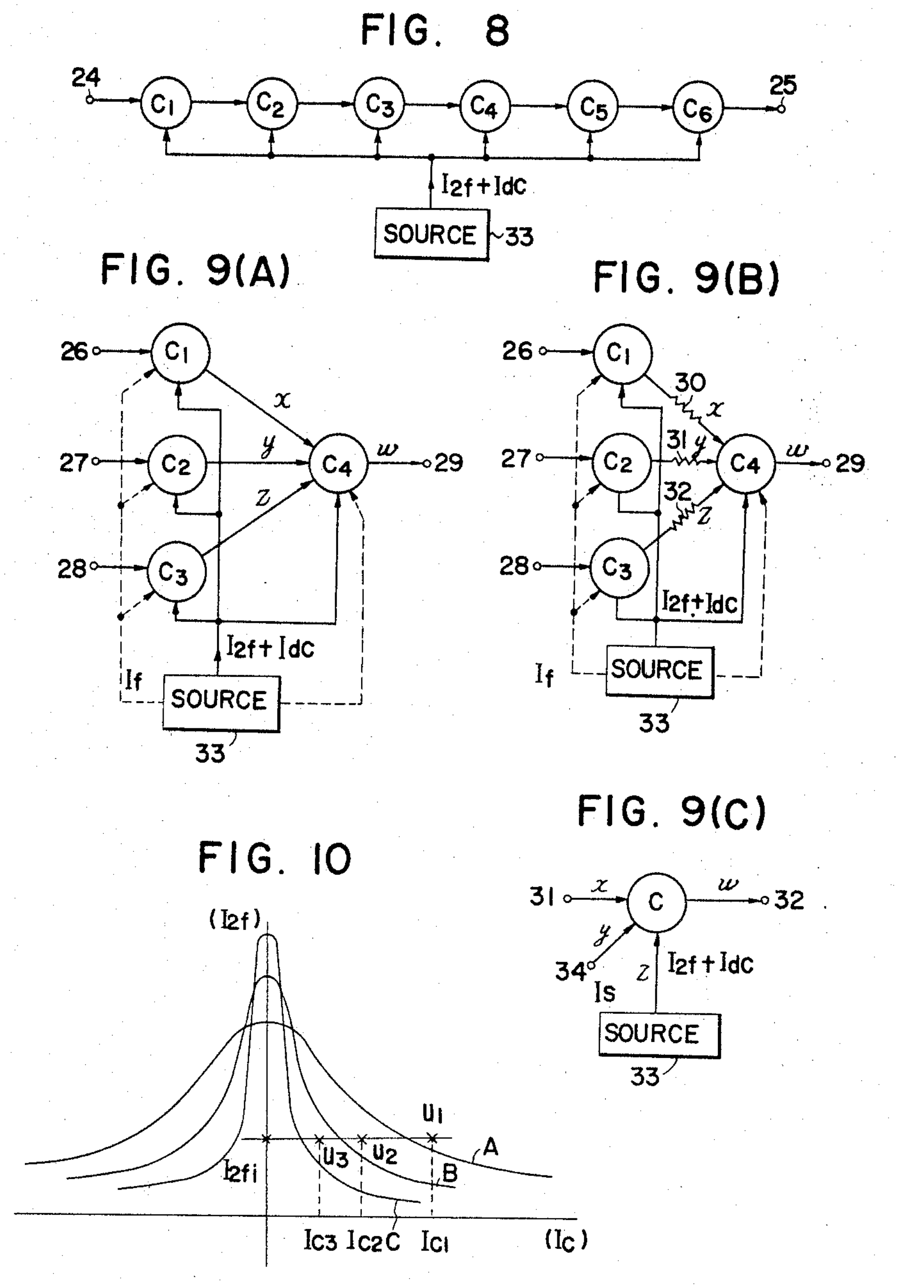
FIGS. 8, 9A, 9B, 9C, 11 and 12 illustrate various logical circuits utilizing the oscillation circuit of this invention.

Turning now to logical circuits employing the oscillation circuits of this invention, FIG. 8 illustrates a block diagram of an example of a shift register which is the fundamental circuit element for effecting logical operations. In FIG. 8, reference characters $C_1$, $C_2$, $C_3$, $C_4$, $C_5$ and $C_6$ represent suitable oscillation circuits, such as shown in FIGS. 6A, 6B, 6C, 6D or 6E which are parametrically excited. Exciting current $I_{cf}$ have a frequency and a bias current $I_{DC}$ are continuously supplied to the respective oscillation circuits from an excitation source 33. When an input signal $I_1$ is applied to an input terminal 24, the oscillation circuit $C_1$ first commences to oscillate, and its output is then supplied to the next oscillation circuit $C_2$, thereby to start its operation. Thus, the succeeding oscillators $C_3$, $C_4$, $C_5$ and $C_6$ oscillate sequentially in the order mentioned to provide an output signal at an output terminal 25. Upon termination of the input signal $I_1$, the oscillators are stopped sequentially in the same order as above described. The circuit shown in FIG. 8 may be used as a delay circuit.

FIG. 9A shows an example of an OR circuit. A plurality of oscillation circuits $C_1$, $C_2$ and $C_3$ controlled by input signals which are respectively applied to input terminals 26, 27 and 28 are provided to supply their output *x*, *y* and *z* to an oscillator $C_4$. By so constructing the circuit that any one of the outputs *x*, *y* and *z* can initiate the oscillation in the oscillation circuit $C_4$, it is possible to operate this circuit $C_4$ as an OR circuit to provide an output *w*. Level setting of this OR circuit can be understood from the following description by referring to FIG. 10 which illustrates approximate characteristic curves indicating the oscillation region of an oscillation circuit controlled by a plurality of cores (three in this case). Although somewhat different from those shown in FIG. 5, it is possible to provide characteristic curves as shown in FIG. 10 by suitable control of the manufacturing steps of the magnetic films. The only requirement for this is that the characteristic curves shown in FIG. 4 be shifted in parallel direction in accordance with the increase of the intensity of the transverse field. The abscissa and ordinate represent the current $I_c$ for producing the transverse field (input signal current) and the excitation current $I_{2f}$, respectively. The curve A shows the characteristic when the current $I_c$ is passed through only one core, curve B shows that when the circuit is controlled by passing the same current $I_c$ through two cores, and curve C shows that when the circuit is controlled by passing the same current $I_c$ through three cores. As can be observed from these characteristic curves, in order to make the circuit shown in FIG. 9A operate as an OR circuit, it is necessary to construct the circuit in such a manner that any one of the input signals *x*, *y* and *z* will cause a current $I_{c1}$ for producing the transverse magnetic field to flow through the corresponding one of the primary conductors $L_{P1}$, $L_{P2}$ and $L_{P3}$, thereby to provide the operating point $U_1$, where the oscillation circuit is excited by a current $I_{2f1}$.

FIG. 9B illustrates an example of the construction of an AND circuit which differs from the circuit shown in FIG. 9A in that the levels of the inputs *x*, *y* and *z* supplied to the AND circuit are regulated by means of resistors 30, 31 and 32 and that the levels are set to pass a current $I_{c3}$ through any one of the primary conductors $L_{P1}$, $L_{P2}$ and $L_{P3}$. The operating point of the oscillation circuit in this case will be at a point $U_3$. (Similarly, for an AND circuit including two cores, the levels are selected to bring the operating point to $U_2$.)

FIG. 9C illustrates an example of a NOT circuit. If the operating point is preset to be in the oscillation region by a proper DC bias current $I_s$ applied to an input terminal 34 (for example at points $U_4$ or $U_5$ in FIG. 5) an output can be obtained from an output terminal 32 under the normal condition, but application of a DC or AC input signal upon an input signal 31 will bring the oscillation circuit C out of the oscillation region, thereby stopping the oscillation thereof.

Figure 11:
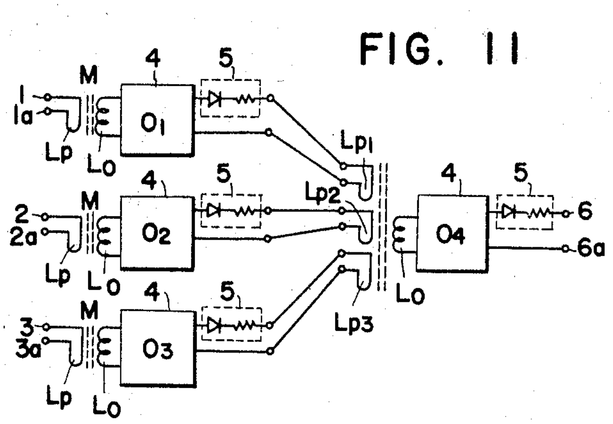
Figure 12:
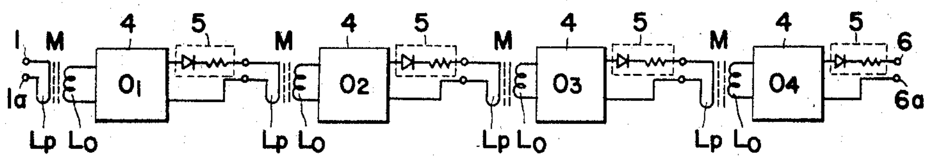

FIGS. 11 and 12 illustrate examples of logical circuits constructed by utilizing oscillation circuits including active elements such as those shown in FIG. 2A, 2B, 3A, 3B, 3C, 3D or 3E. The various reference characters and numerals indicate the identical components used in the above described circuits. FIG. 11 shows an example of an OR circuit or an AND circuit, and FIG. 12 shows an example of a shift register.

Figure 13A:
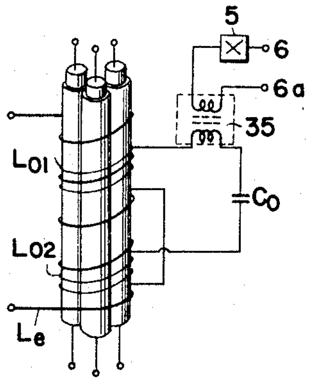
FIGS. 13A and 13B show schematic views of two examples of the method for coupling the oscillation circuits embodying this invention.
Figure 13B:
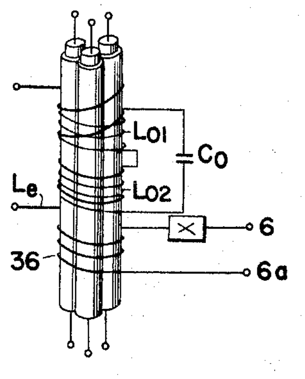

Although it has been pointed out in the above embodiments that, as a means 5 for coupling an oscillation circuit of the preceding stage with that of the succeeding stage, a capacitor, a rectifier or a combination of them may be utilized, it is to be understood that any other suitable means can also be used. For example, as shown in FIG. 13A, a transformer 35 may be included in the tuning circuit of an oscillation circuit to provide the output across output terminals 6 and 6*a* through said transformer. Alternatively, as shown in FIG. 13B, the core may be excited in the opposite direction with respect to the oscillation circuits $L_{o1}$ and $L_{o2}$ so as to derive the output from a coil 36 wound on the core. A component having the oscillation frequency *f* will be induced in the coil 36, but a component having the excitation frequency 2*f* will not be induced therein. Any other suitable coupling means can also be utilized.

As will be clear from the foregoing description, the control speed of the oscillation circuit constructed according to the principle of this invention is very high, because oscillations are initiated or terminated when the magnitude of the input signal voltage exceeds a predetermined value. The results of experiments show that the time interval required to build up the oscillation is about 5 microseconds when a control pulse having a duration of 10 microseconds is used. Further, even though a parametrical excitation is used, an excitation by a continuous wave may be used without the necessity of using interrupted three-phase excitation waves as in the conventional parametron circuits. Thus, there are many advantages such as high speed of logical operation, and possibility of reducing the source of the excitation current. The most outstanding feature of the oscillation circuit of this invention is that it does not utilize the "phase" as the essential parameter. As already mentioned, since the logical operations are carried out on the basis of the "amplitude," the logical circuits can be constructed in a most effective manner by utilizing high frequencies above 10 megacycles to assure high speed operations.

Since it is obvious that many changes and modifications can be made in the above described details without departing from the nature and spirit of the invention, it is understood that the invention is not to be limited to the details described herein except as set forth in the appended claims.

What is claimed is:

1. An oscillation circuit comprising a ferromagnetic thin film core carrying a primary conductor and a secondary conductor and an oscillator associated with said secondary conductor, said oscillator having a resonance circuit, said primary conductor being arranged so that a current flowing therethrough magnetizes said thin film core in the direction orthogonal to the easy axis of the thin film core, said secondary conductor being arranged so that the magnetic flux produced by a current flowing in the secondary conductor is parallel to the easy axis of the thin film, and means for applying during operation an input signal to the primary winding, whereby the oscillation of the oscillator is regulated in accordance with a deviation of Q of said resonance circuit of the oscillator caused by the application of said input signal and as a function of the amplitude of said input signal.

2. An oscillation circuit comprising a ferromagnetic thin film core carrying a plurality of primary conductors and a secondary conductor and an oscillator associated with said secondary conductor, said primary conductor being arranged so that a current flowing through the primary conductor magnetizes the thin film core in the direction orthogonal to the easy axis of the thin film, said secondary conductor being arranged so that the magnetic flux caused by a current in the secondary conductor is parallel to the easy axis of the film, and input signals being respectively applied to said primary conductors, whereby the oscillation of the oscillator is regulated individually with the application of any of said different input signals.

3. An oscillation circuit comprising a plurality of ferromagnetic thin film cores, each comprising a linear conductor with a thin ferromagnetic film deposited thereon, an oscillator and a winding wound on said core coaxially therewith, said oscillator being associated with said winding, whereby when a plurality of input signals are respectively applied to said primary conductors the oscillation of said oscillator is individually regulated in accordance with the deviation of Q of a resonance circuit of the oscillator caused by the application of any of said different input signals.

4. An oscillation circuit comprising a plurality of ferromagnetic thin film cores, each comprising a linear conductor with a thin ferromagnetic film deposited thereon, a winding wound on said core coaxially therewith and a capacitor connected in parallel with the winding, said cores being parametrically and continuously excited with an exciting frequency $2f$, said winding and said capacitor constituting a resonance circuit which resonates at a frequency $f$, whereby the parametrical oscillation of frequency $f$ generated in said resonance circuit is individually regulated with the deviation of Q of the resonance circuit caused by the application of any of the input signals to said linear conductors.

5. A plurality of oscillation circuits each comprising a plurality of ferromagnetic thin film cores, each being composed of a linear conductor with a thin ferromagnetic film deposited thereon, an oscillator and a winding wound on said core coaxially therewith, said oscillator being associated with said winding, the oscillation signal of a just preceding oscillation circuit being applied to any of said linear conductors of the just succeeding oscillation circuit, whereby when an oscillation circuit of the preceding stage generates an oscillation thereof in accordance with the application of an input signal to the linear conductor thereof, oscillations of a plurality of the oscillation circuits start in succession according to the order of connection, said oscillations terminating in succession according to the order of connection when said input signal terminates.

6. A plurality of oscillation circuits, each comprising a plurality of ferromagnetic thin film cores, each being composed of a linear conductor with a thin ferromagnetic film deposited thereon, a winding wound on said core coaxially therewith and a capacitor connected in parallel with the winding, said thin film cores being parametrically and continuously excited with an exciting frequency $2f$, said winding and said capacitor constituting a resonance circuit which resonates at a frequency $f$, whereby when an oscillation circuit of a preceding stage generates the parametrical oscillation thereof in accordance with the application of an input signal to the linear conductor thereof, parametrical oscillations of a plurality of oscillation circuits start in successive sequence according to the order of connection, said oscillations terminating in succession according to the order of connection when said input signal terminates.

References Cited

UNITED STATES PATENTS

| | | | |
|---|---|---|---|
| 3,292,001 | 12/1966 | Constantine | 307—88 |
| 3,275,839 | 8/1966 | Baktik | 307—88 |

FOREIGN PATENTS

| | | |
|---|---|---|
| 1,293,896 | 4/1962 | France. |

JAMES W. MOFFITT, *Primary Examiner.*

U.S. Cl. X.R.

340—174